United States Patent [19]

Borgnis et al.

[11] Patent Number: 5,263,028
[45] Date of Patent: Nov. 16, 1993

[54] FRAME TRANSFER DEVICE FOR A FIXED FORMAT FRAME TRANSMISSION NETWORK

[75] Inventors: Philippe Borgnis, Vence; Jacques Cresp; Robert Moreau, both of Nice, all of France

[73] Assignee: International Business Machines Corp., Armonk, N.Y.

[21] Appl. No.: 826,336

[22] Filed: Jan. 27, 1992

[30] Foreign Application Priority Data

Sep. 26, 1991 [EP] European Pat. Off. ......... 91480152.7

[51] Int. Cl.⁵ ................................................ H04J 3/06
[52] U.S. Cl. ................................. 370/105.1; 375/114
[58] Field of Search .............. 370/105.1, 108, 100.1, 370/94.1, 94.2, 105.4, 105.5, 111; 375/118, 114, 116, 106, 111; 371/5.4, 47.1

[56] References Cited

U.S. PATENT DOCUMENTS

| | | | |
|---|---|---|---|
| 4,345,325 | 8/1982 | Gandini et al. | 370/108 |
| 4,748,623 | 5/1988 | Fujimoto | 370/105.1 |
| 4,974,225 | 11/1990 | Chenier et al. | 370/105.1 |

FOREIGN PATENT DOCUMENTS 0285334 5/1988 European Pat. Off. .
8602219 4/1986 World Int. Prop. O. .

*Primary Examiner*—Douglas W. Olms
*Assistant Examiner*—Ajit Patel
*Attorney, Agent, or Firm*—Joscelyn G. Cockburn

[57] ABSTRACT

A frame transfer mechanism for a processor controlled network node connected to network link wherein fixed-length data frames including a fixed number of slots are to be transferred to and from a memory (10) under processor (23) control. The incoming data flow through a FIFO-IN shift register (22). The outgoing frames flow through a FIFO-OUT (24) register. Both FIFO shift registers are provided with an extra bit position which is used to insert a synchronization-bit (flag) used to control synchronization operation of the system and incoming frames. The extra-bit position is fedback from FIFO-OUT to FIFO-IN to enable wrap-test operation.

6 Claims, 7 Drawing Sheets

NORMAL SYNCHRONIZED PROCESS

FIG. 7

FRAME TRANSFER DEVICE FOR A FIXED FORMAT FRAME TRANSMISSION NETWORK

This invention deals with digital transmission networks and more particularly with a mechanism for monitoring and synchronizing fixed format frame transfers within a network node.

BACKGROUND OF INVENTION

In a digital transmission network, data from a large number or users are serially transmitted from one network node to another, up to their respective final destination. Efficiency is achieved through combining use of high speed links between the various network nodes, and so-called Time Division Multiplex (TDM) techniques whereby the data provided by said users are multiplexed over a common frame for being fed onto a same link or trunk facility. Each user is being assigned one or several frame slots for inserting data therein. For instance, a T1 fixed length frame might include 32 slots, numbered zero to thirty one. Each slot content path throughout the network will depend upon the final considered data destination as well as upon dynamically assigned network path.

Usually, several network nodes have to be flown through between any transmitting user and the corresponding final data destination. At each node incoming frames have to be individually identified. Each slot data are deserialized and temporarily stored into a memory until time is reached for reinserting said data into a node outgoing frame slot toward the next node. Each node is provided with several ports and the data handling process has to be very fast and yet free of any error or loss of data.

Generally, the deserializing and correlative serializing operations are performed into a network interface, and then the data transfers to and from memory are micro-processor controlled. Obviously those data transfers have to be properly synchronized.

Conventionally, a synchronization or clock information is derived from a slot content within each node incoming frame. Said clock is, in turn, used to synchronize outgoing frames. In other words, data transfers between network interface adapter and memory are not fully monitored. Should a failure occur in the transfer flow, the system may not be aware of it. Consequently, for instance, same byte may be sent repetitively without any error indication being provided by the network interface.

One object of this invention is to provide a mechanism with the capability of continuously monitoring network node frame synchronization.

Another object of this invention is to provide frame data transfer synchronizing mechanism enabling monitoring data transfers in both directions within a network node as well as providing means for on-line diagnostic.

More particularly, an object of this invention is to provide a frame transfer mechanism for a processor controlled network node connected to network link, wherein fixed length data frames including a fixed number of slots are received as input frames including individual slot contents to be transferred and stored into a memory for later transmission within output frames over the network link, said frame transfer mechanism including:

a network adapter including deserializing/serializing means connected to said link for deserializing the received frame slots contents to be transferred to the memory, or serializing the memory provided data to be transmitted onto the link;

FIFO like shift register means connected between said memory and said serializing/deserializing means as FIFO-OUT and FIFO-IN means respectively, said FIFO's including an extra-bit position as compared to the defined frame slot length;

shifting means for shifting FIFO's contents;

means for inserting a flag bit into a predefined FIFO-OUT extra bit position;

means sensitive to a received frame over the link to derive a network synchronization signal therefrom;

synchronization logic means sensitive to said FIFO-OUT flag bit detection and to said network synchronization signal concurrence to derive therefrom an indication of normal synchronized transfer mechanism operation.

This and other objects, characteristics and advantages of the present invention will become more readily apparent from the following specifications when taken in conjunction with the figures.

Figure 1:
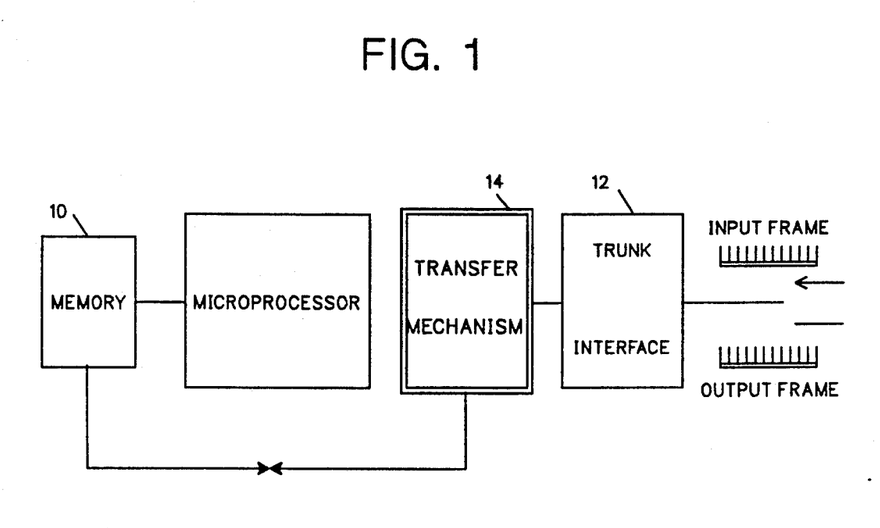
FIG. 1 shows a schematic representation of the transfer mechanism.

FIG. 1 shows a schematic representation of the transfer mechanism to be considered herein. The mechanism is meant for the transfer of fixed format frames contents vehiculated over the network lines to and from memory 10. A trunk interface facility 12 is connected to the communication line for deserializing each input frame slot contents (eight bits) and serializing data by inserting into output frames. The transfer mechanism 14 cooperates with a microprocessor and with the trunk interface facility to control data transfers to and from the memory wherein said data are temporarily stored.

The ultimate goal of the transfer mechanism is to assure a correct synchronism, in term of received slot assigned numbers, storage of the input data flow into the memory, as well as a correct transmission to the line of the output data taken from the memory. This requires that the transfer mechanism be capable of controlling the initial phase to set-up the synchronism between input and output data flows, as well as detecting any loss of synchronism, and assure a quick re-synchronization of the system, whenever required.

Figure 2:
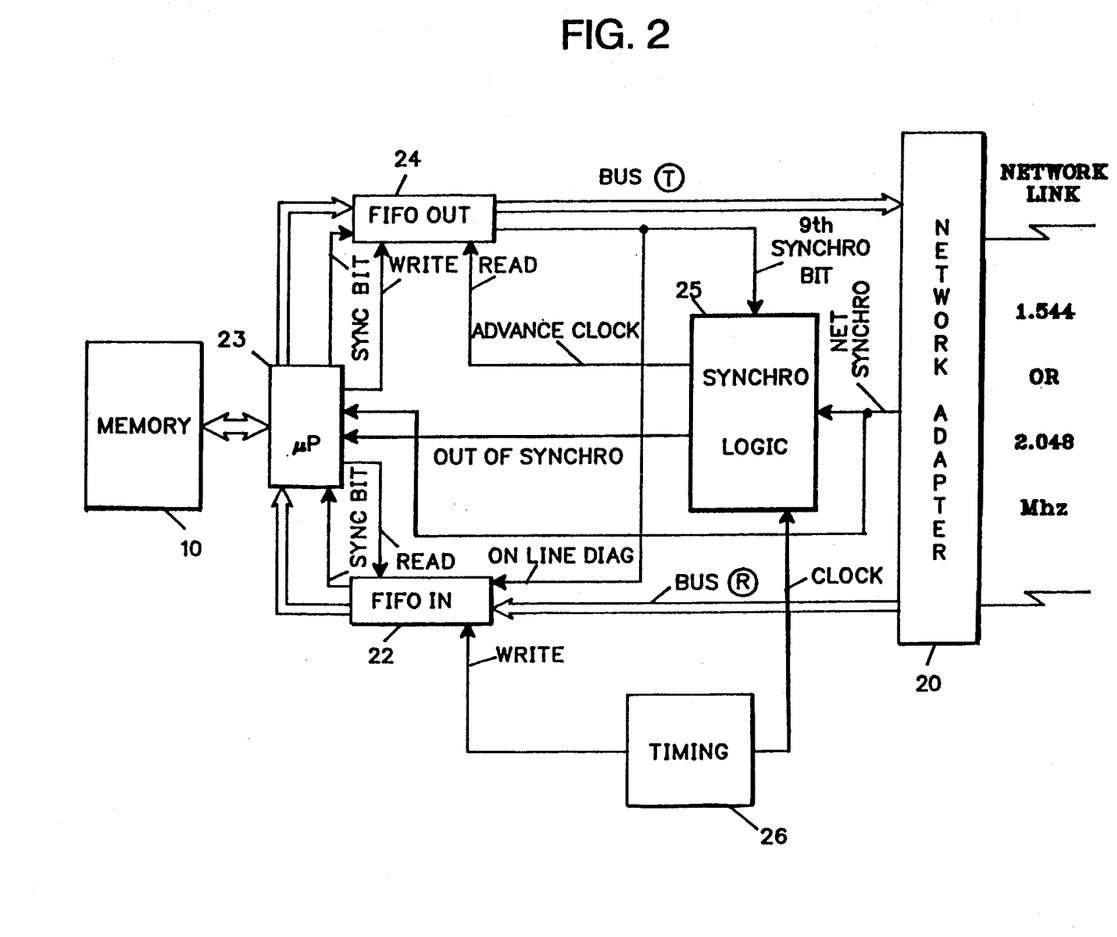
FIG. 2 is an architecture of the device of this invention.

Represented in FIG. 2 is a detailed architecture of the frame transfer mechanism including this invention. Two data flows have to be considered. One identified as data (R) (for received data) flowing from the network up to memory 10, the other identified data (T) (for transmitted data) flowing the other direction, i.e. from memory 10 to network.

On the receiving side, a deserializer within the network adapter (20) transforms the received data into eight-bit words. Said words are forwarded through an eight-bit data bus (BUS R), to a shift register FIFO IN 22. The FIFO IN register is made to include a 9th bit position to be used for a synchronization bit. The data bits are forwarded to memory 10 under the control of microprocessor 23. The synchronization bit line is also connected from FIFO IN 22 to the microprocessor 23.

In the reverse direction (i.e. transmit side), eight-bit words data are fed from memory 10, under microprocessor 23 control into a shift register 24 (FIFO OUT) including also a 9th bit position for the synchronization bit. The eight data bits out of register 24 are fed to network adapter 20 and then serialized onto the network as data out, while the synchronization bit position is fed into both the 9th bit position of register 22, and a synchronization logic device 25 providing a read or advance clock command to register 24.

The synchronization logic device 25 is also provided a timing command from a timing device 26, which also provides a write command to register 22. Both, write command to register 24 and read command to register 22 are provided via the microprocessor 23. A network synchronization (NET synchronization) command is provided, via network adapter 20, to both synchronization logic device 25 and microprocessor 23. It should be already noted that, in fact, the synchronization bit (9th bit) is provided to FIFO-OUT and fedback therefrom to FIFO-IN.

Figure 3:
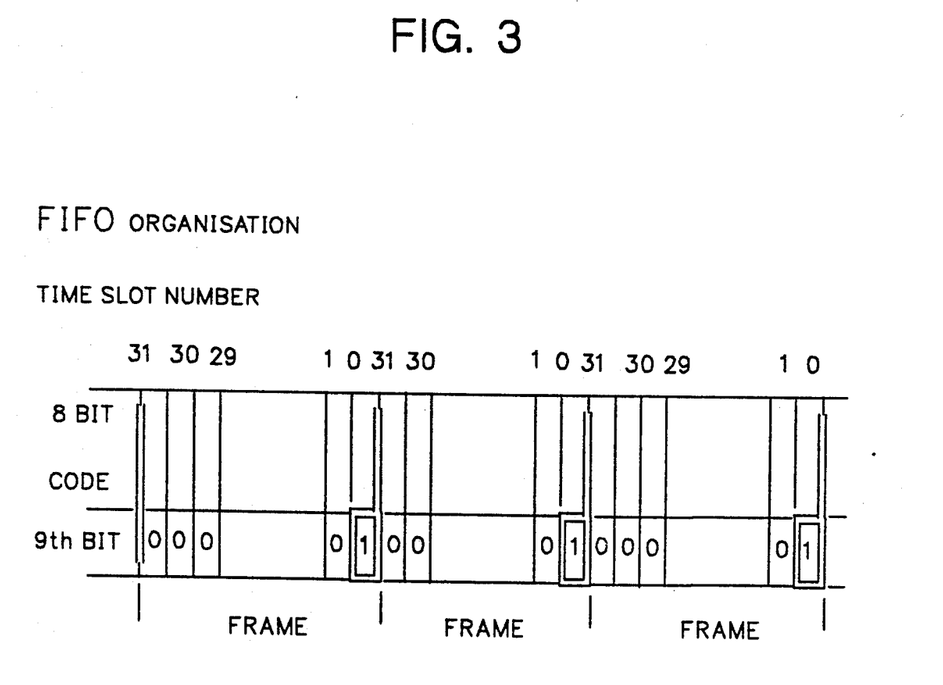
FIG. 3 is a schematic representation of a sequence of data frames to be used in this invention.

As shown in FIG. 3, both FIFO's organization reflect the image of the frames in that they both include thirty two words positions, each word including eight bits code. The word positions are numbered zero to thirty one, as are the received and transmitted frames slots.

As far as data bits are concerned, for the received side, they are written, as received in FIFO-IN and transferred to the memory under the microprocessor management control, while for transmit side the memory is early prepared with the image of data to be sent and written into FIFO-OUT register 32 bytes at a time at the occurrence of the network synchronization acting as an interrupt (e.g. every 125 micro seconds for an 8 KHz network synchronization).

The network synchronization time information is conventionally derived from detecting the occurrence of a received frame slot zero.

At said network synchronization time, a flag bit is written by the microprocessor into the 9th bit position of slot zero of FIFO-OUT register. As represented in FIG. 2, this flag bit position is looped-back into FIFO-IN 9th bit position. The flag is therefore fedback into FIFO-IN shift register.

It will be used to perform on-line diagnostic of operation between memory and FIFO's by operating as a wrap test flag.

Figure 4:
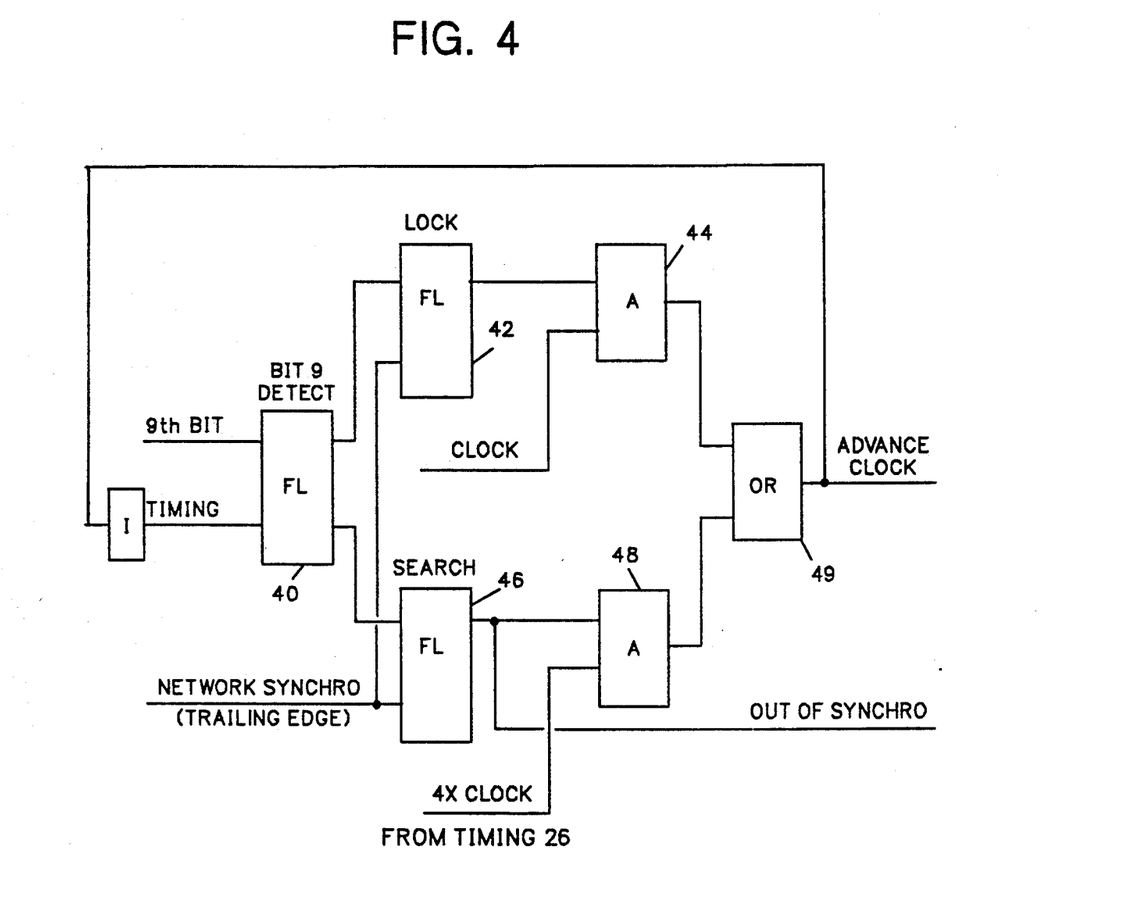
FIG. 4 is a logic device for the invention.

A detailed description of synchronization logic device is shown in FIG. 4. A first flip-flop 40 acting as 9th bit detect is connected to the 9th bit output position of FIFO-OUT, and to an inverter, connected in turn to the synchronization logic device output. One output of 9th bit detect circuit 40 is fed into a so-called "lock" flip-flop 42. The output of device 42 is ANDed in 44 with the clock data provided by the timing device 26. The other output of 9th bit detect device 40 is fed into a so-called search flip-flop 46. The output of 46 (i.e. out of synchronization) is ANDed in 48 with a four time accelerated clock. The outputs of both AND devices 44 and 48 are ORed in 49 to provide the Advance Clock indication used to read FIFO-OUT.

In operation, the overall synchronization process shall include a start-up process initializing the FIFO at power-on. This is achieved to clear any current random content of FIFO's at power-on time, and to correctly position and mark the first slot before any data reception or transmission starts. To that end, a series of reading and writing operations are executed. It is more convenient to start with the synchronization of the transmit section. The memory and the microprocessor system shall then be ready and locked to store the received data at the right place.

Figure 5:
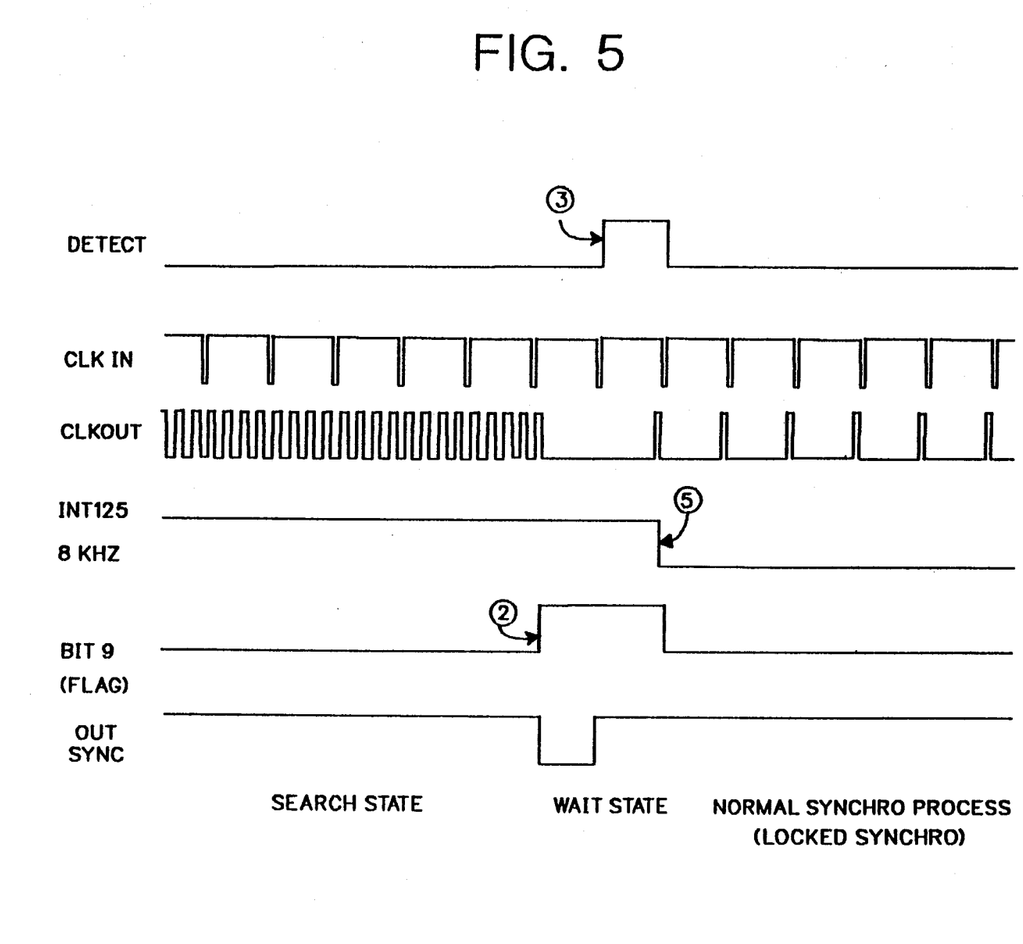
FIGS. 5-7 are time diagrams for the invention.

As represented in the time diagram of FIG. 5, at power-on time, a search process starts with an accelerated clock (see CLKOUT signal) acting as "advance clock" data, four times faster than the basic clock used to control the FIFO's (see CLKIN at 250 KHz every 4 ms). This enables speeding-up the 9th bit (flag) search within FIFO-OUT. Once said 9th-bit is detected (see BIT 9 at 0 in FIG. 5), the system enters into WAIT STATE, the advance clock (CLOCK OUT) is stopped. At next CLOCK-IN timing occurrence, a DETECT signal is set-up (3), waiting for the network synchronization signal trailing edge occurrence (5).

In other words, WAIT STATE is started when the flag has been detected and stays as long as the trailing edge (5) of the synchronization signal is not present. The maximum time the WAIT STATE can last is 125 microseconds, that is in the case the 9th bit flag was detected just after occurrence of a synchronization-signal trailing edge. In FIG. 5, the represented WAIT STATE is very short due to a quite immediate apparition of the synchronization signal trailing edge (5).

The WAIT STATE is only valid during the synchronization phase. Should a WAIT STATE situation occur during normal operation, an error or "out of synchronization" data will be reported to the micro-processor 23.

Upon termination of WAIT STATE, the system is locked to NORMAL SYNCHRONIZED PROCESS.

Figure 6:
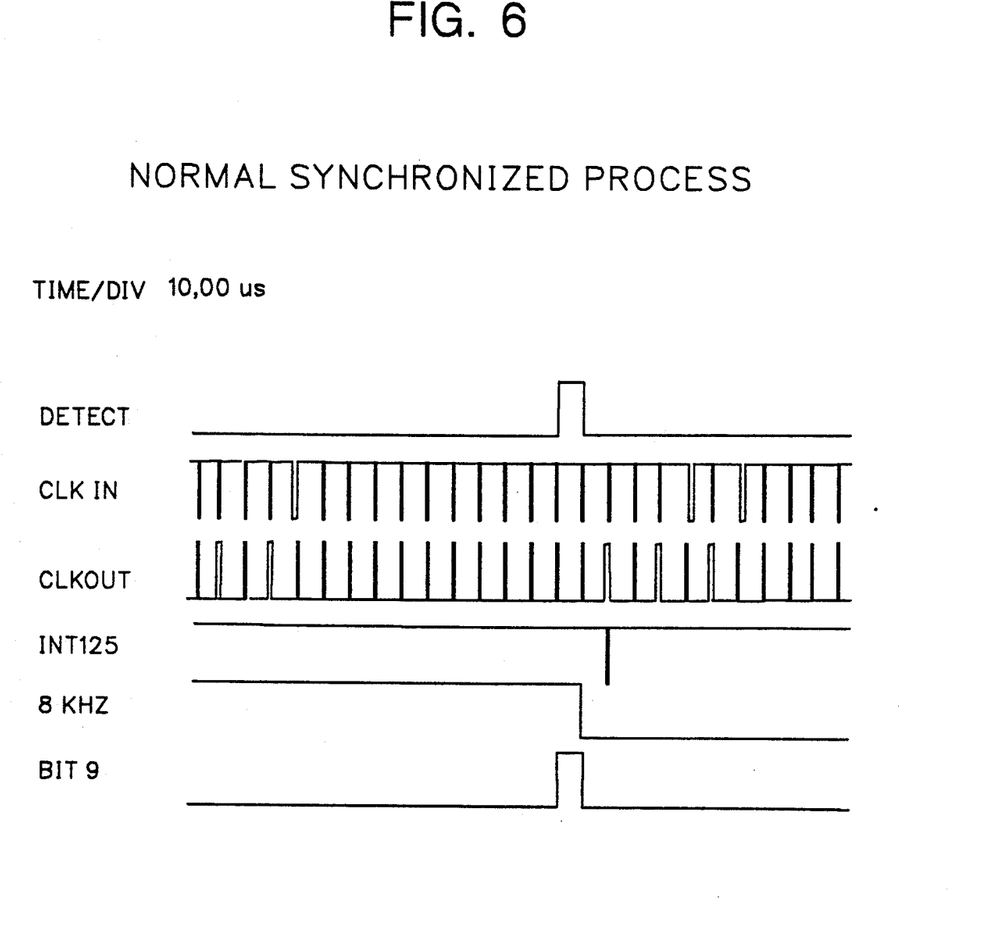

Represented in FIG. 6 is a time diagram of said NORMAL SYNCHRONIZED PROCESS. The occurrence of this state of operation means that the synchronization is fully acquired and the FIFO's are in synchronism with the network. The system has, now, only to check the just in time repetition of the 9th bit (flag) detection, in coincidence with the network synchronization trailing edge signal. Should this be lost during normal operation, an error ("out of synchronization") indication is reported to the microprocessor.

The error denoting "out of synchronization" alerts the microprocessor in two different occasions. In normal operation, while the synchronization signal is not in time with the flag bit. But also during the initial synchronization process, in which case the error indication will not be active to avoid disturbing the synchronizing process in synchronization research process step.

In normal operation, the system of this invention suits particularly well to on-line diagnostics of no failure, through a wrap-test operated over the 9th bit flag.

Since the synchronization system needs only checking the in-phase occurrence of the 9th-bit flag with the network synchronization indication, the time space between two consecutive flags is idle in the FIFO's operation.

The microprocessor controlled system may then use the 9th bit flags. Every 20 ms, a random data pattern is inserted in place of the 9th bit.

This pattern is propagated during normal synchronized process throughout FIFO-OUT and fed back into FIFO-IN 9th bit position via the on-line diagnostic link (see FIG. 2 ON LINE DIAG). The test pattern is read out of FIFO-IN by the micro-processor and checked for matching with expected pattern. The tested path may also include the memory by reading the test pattern in and out of memory 10. This enables not only checking the complete path operation but also checking memory operation to some extent.

Assuming the so-called FIFO's are in fact memory devices with moving pointers simulating the read/write commands, the on-line diagnostics or wrap test may fail to operate if FIFO's are frozen while the pointers are running. This drawback is taken care off herein without any increase in complexity being required. For that purpose the test pattern is made to vary between consecutive 9th bit flags, while being monitored and controlled by the processor 23.

Figure 7:
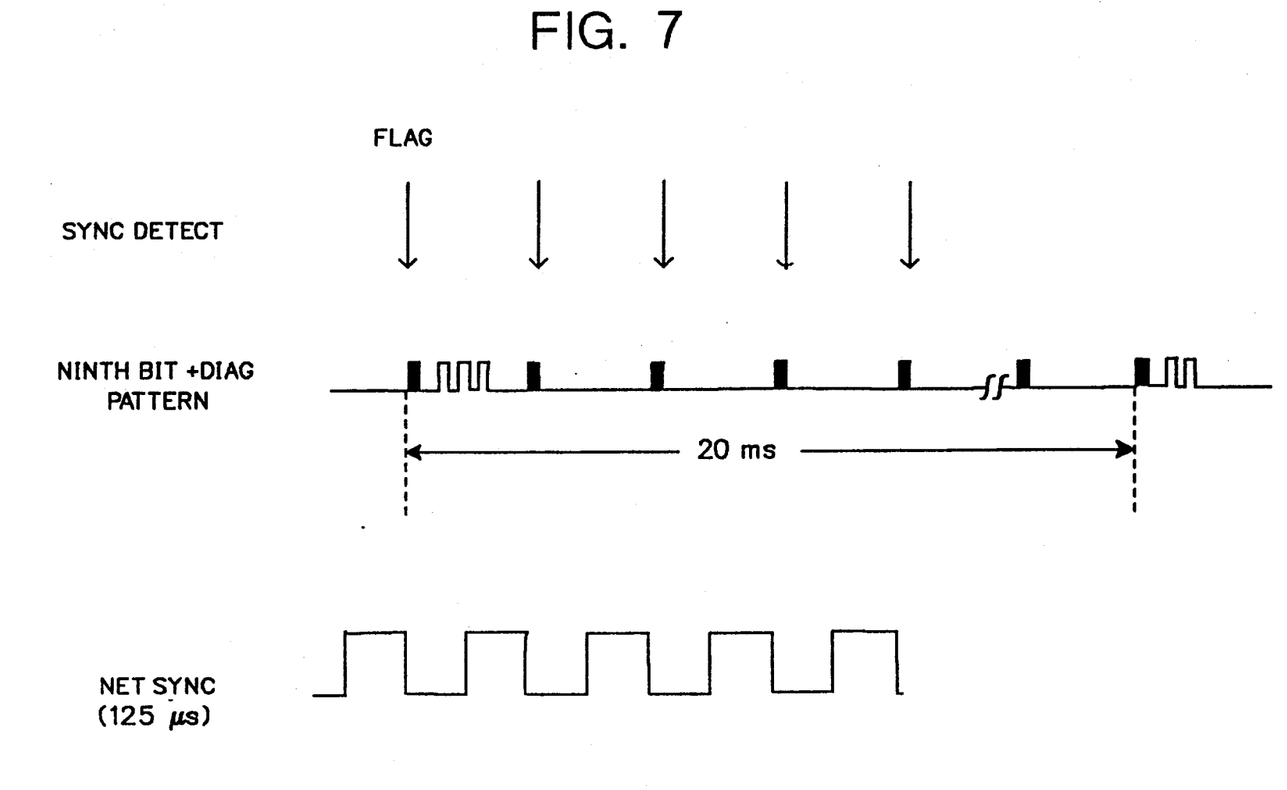

The above is schematically illustrated in the time pattern of FIG. 7. One should therefore notice that the term FIFO is used herein to include both conventional shift registers and memories with shifting pointers, acting as shift registers. Both are herein referred to as FIFO-like shift register means.

We claim:

1. A frame transfer mechanism for a processor controlled network node connected to network link, wherein fixed length data frames including a fixed number of slots with each slot containing a predetermined number of bits are received as input frames to be transferred and stored into a memory for later transmission within output frames over the network link, said frame transfer mechanism including:

a network adaptor (20) including deserializing/serializing means connected to said link for deserializing data received frame slots contents to be transferred to the memory, and serializing the memory provided data to be transmitted onto the link;

a storage means connected between said memory and said serializing/deserializing means; said storage means being partitioned into a first section for storing the predetermined number of bits received from the input frames, a second section for storing the predetermined number of bits to be transmitted in the output frames and one extra bit position each for storing a flag bit coupled to the first section and the second section;

shifting means having outputs coupled to the storage means and for shifting the bits from the first section and the second section;

means (23) for inserting the flab bit into the bit position which is coupled to the second section;

means sensitive to a received frame over the link to derive a network synchronization signal therefrom said means being located in the network adapter (20); and synchronization logic means (25) responsive to said flag bit and to said network synchronization signal to derive therefrom an indication signal which indicates normal synchronized transfer mechanism operation whereby the indication signal is used to read the second section.

2. A frame transfer mechanism as claimed in claim 1, wherein said storage means includes a random access memory; and pointers for selecting positions in said random access memory.

3. The frame transfer mechanism as claimed in claim 1 wherein the second section includes a FIFO-OUT shift register (24) and the first section includes a FIFO-IN shift register (22).

4. A frame transfer mechanism as claimed in claim 3, further including means for accelerating FIFO-OUT shifting operations at node power-on time until said synchronization logic means detects said flag bit.

5. A frame transfer mechanism as claimed in claim 4, wherein said synchronization logic means include WAIT STATE setting means sensitive, at power-on, to said flag bit detection to monitor the network synchronization signal occurrence and generate an out of synchronization error signal if said network synchronization signal does not occur after a predefined time delay.

6. A frame transfer mechanism according to claim 4, further including means for feeding the flag bit back into the extra-bit position of the FIFO-IN shift register (22) to enable monitoring and controlling data transfer from the FIFO-IN shift register (22) to the memory, from the memory to the FIFO-OUT shift register (24), adequate synchronization, through flag detection.

* * * * *